(12) United States Patent
Takita

(10) Patent No.: US 10,244,207 B2
(45) Date of Patent: Mar. 26, 2019

(54) VIDEOCONFERENCE COMMUNICATION DEVICE

(71) Applicant: Panasonic Intellectual Property Management Co., Ltd., Osaka (JP)

(72) Inventor: Takeshi Takita, Fukuoka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/556,131

(22) PCT Filed: Feb. 8, 2016

(86) PCT No.: PCT/JP2016/000629
§ 371 (c)(1),
(2) Date: Sep. 6, 2017

(87) PCT Pub. No.: WO2016/147538
PCT Pub. Date: Sep. 22, 2016

(65) Prior Publication Data
US 2018/0048866 A1    Feb. 15, 2018

(30) Foreign Application Priority Data

Mar. 17, 2015 (JP) ................ 2015-053432
Mar. 17, 2015 (JP) ................ 2015-053438

(51) Int. Cl.
*H04N 7/15* (2006.01)
*H04N 5/445* (2011.01)
(Continued)

(52) U.S. Cl.
CPC ............ *H04N 7/15* (2013.01); *H04M 3/567* (2013.01); *H04N 5/44591* (2013.01); *H04N 7/147* (2013.01); *H04N 7/155* (2013.01)

(58) Field of Classification Search
USPC ....................................... 348/14.07
See application file for complete search history.

(56) References Cited

U.S. PATENT DOCUMENTS 5,936,662 A * 8/1999 Kim ............... H04N 7/152
                                                    348/14.09
2004/0257433 A1* 12/2004 Lia ................. H04N 7/147
                                                    348/14.09
(Continued)

FOREIGN PATENT DOCUMENTS

JP    9-224228     8/1997
JP    2000-270305  9/2000
(Continued)

OTHER PUBLICATIONS

International Search Report dated Mar. 29, 2016 in International (PCT) Application No. PCT/JP2016/000629.

*Primary Examiner* — Amal S Zenati
(74) *Attorney, Agent, or Firm* — Wenderoth, Lind & Ponack, L.L.P.

(57) ABSTRACT

A videoconference communication device prevents a screen from being unsightly to a viewer. A communication controller (103) is connected to respective partner devices (2), (3), and (4) through a network (5) and receives video data transmitted from respective partner devices (2), (3), and (4). A video and voice synthesizer (105) and a video and voice output controller (106) causes divided screens divided into a total number of sites in which a videoconference is performed, in display device (9) to be displayed before video data is received by the communication controller (103), and causes each region of the divided screens to sequentially display video data received by the communication controller (103).

3 Claims, 7 Drawing Sheets

(51) Int. Cl.
*H04N 7/14* (2006.01)
*H04M 3/56* (2006.01)

(56) References Cited

U.S. PATENT DOCUMENTS

| | | | | |
|---|---|---|---|---|
| 2009/0044120 | A1* | 2/2009 | Miyamoto | H04N 1/00291 715/723 |
| 2014/0119243 | A1 | 5/2014 | Oike | |
| 2014/0371892 | A1 | 12/2014 | Takahashi | |

FOREIGN PATENT DOCUMENTS

| | | |
|---|---|---|
| JP | 2001-313915 | 11/2001 |
| JP | 2009-246649 | 10/2009 |
| JP | 2013-197766 | 9/2013 |
| JP | 2014-90379 | 5/2014 |
| JP | 2014-241525 | 12/2014 |

\* cited by examiner

VIDEOCONFERENCE COMMUNICATION DEVICE

TECHNICAL FIELD

The present disclosure relates to a videoconference communication device which is provided at a host site and can be simultaneously connected to partner devices of a plurality of sites different from the host site.

BACKGROUND ART

In the related art, there is a known videoconference system capable of being simultaneously connected to partner devices of a plurality of sites so as to hold a videoconference (for example, PTL 1). The videoconference system decodes data transmitted from respective partner devices for each partner device, synthesizes video data each time decoding is completed, and displays the synthesized video data.

CITATION LIST

Patent Literature

PTL 1: Japanese Patent Unexamined Publication No. 2014-241525

SUMMARY OF THE INVENTION

A videoconference communication device according to the present disclosure adopts a configuration in which the videoconference communication device that is provided at a host site and is simultaneously connectable to partner devices of a plurality of sites different from the host site includes a communication controller that is connected to the respective partner devices through a network and receives video data which is transmitted from the respective partner devices; and a display controller that displays divided screens divided into a total number of sites in which the videoconference is performed before the video data is received by the communication controller, and sequentially displays the video data which is received by the communication controller in each region of the divided screens.

According to the present disclosure, since synthesized video can be displayed from the start without changing a layout of a screen, it is possible to prevent the screen from being unsightly to a viewer.

DESCRIPTION OF EMBODIMENTS

Figure 1:
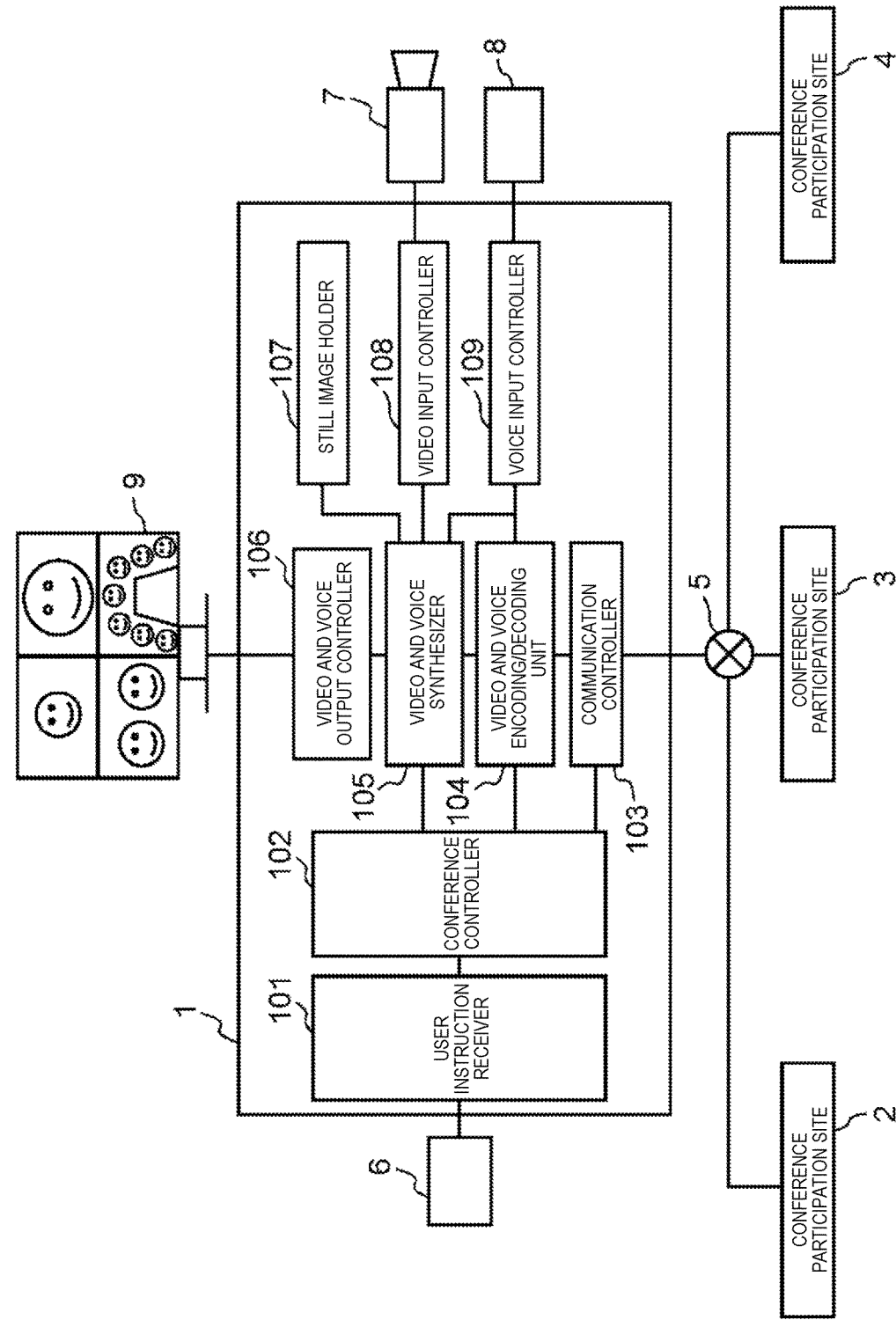
FIG. 1 is a block diagram illustrating a configuration of a videoconference communication device according to Exemplary Embodiment 1.

Prior to describing the embodiments, problems in the prior art will be briefly described. A videoconference communication device in the related art displays synthesized videos while changing a layout of a screen each time decoding is completed, and thereby, an unsightly screen is produced for the viewer.

An object of the present disclosure is to provide a videoconference communication device that can prevent an unsightly screen from being produced for a viewer.

Hereinafter, embodiments of the present disclosure will be described in detail with reference to the drawings as appropriate.

(Exemplary Embodiment 1)
<Configuration and Connection Relationship of Videoconference Communication Device>

First, a configuration and a connection relationship of videoconference communication device 1 according to Exemplary Embodiment 1 will be described in detail with reference to FIG. 1.

Videoconference communication device 1 and partner devices (conference participation sites) 2, 3, and 4 are installed at sites different from each other. Videoconference communication device 1 can be connected to and disconnected from partner devices 2, 3, and 4 through network 5. The number of partner devices connected to videoconference communication device 1 is not limited to three, and can be changed to two, four or more as necessary.

Videoconference communication device 1 transmits/receives voice data and video data through network 5 after completing a connection to each of partner devices 2, 3, and 4. Network 5 is typically the Internet.

Videoconference communication device 1 is connected to user operation input device 6, video input device 7, voice input device 8, and display device 9.

User operation input device 6 detects an operation for selecting a site performed by a user, and transmits a signal including selected site information indicating the selected site to videoconference communication device 1 by wire or wireless manner. Typically, user operation input device 6 is a remote controller or a touch panel.

Video input device 7 outputs video data and the like obtained by capturing a site (hereinafter, referred to as a "host site") where videoconference communication device 1 is installed to videoconference communication device 1. The video data output from video input device 7 includes video data stored in a PC, video data reproduced by a DVD player, and the like, in addition to the video data captured by a camera.

Voice input device 8 outputs voice data and the like obtained by picking up voice of a host site to videoconference communication device 1. The voice data output from voice input device 8 includes voice data which is a set with the video data stored in the PC, voice data which is a set with the video data reproduced by the DVD player, and the like, in addition to the voice data picked up by a microphone.

Display device 9 displays the video data output from videoconference communication device 1 on a screen, and outputs the voice data output from videoconference communication device 1, from a speaker not illustrated.

Videoconference communication device 1 mainly includes user instruction receiver 101, conference controller 102, communication controller 103, video and voice encoding/decoding unit 104, video and voice synthesizer 105, video and voice output controller 106, still image holder 107, video input controller 108, and voice input controller 109. A display controller is configured by video and voice synthesizer 105 and video and voice output controller 106.

User instruction receiver 101 receives a signal transmitted from user operation input device 6, extracts the selected site information included in the received signal, and outputs the extracted information to conference controller 102.

Conference controller 102 controls timing of data input to and output from communication controller 103, video and voice encoding/decoding unit 104, and video and voice synthesizer 105, based on the selected site information input from user instruction receiver 101. In addition, conference controller 102 outputs the selected site information input from user instruction receiver 101 to video and voice synthesizer 105. In addition, conference controller 102 controls signal transmission processing and call establishment processing of communication controller 103, and monitors whether or not video data is received, based on the selected site information.

Communication controller 103 operates at timing according to control of conference controller 102. Communication controller 103 establishes a call with partner devices 2, 3, and 4. After establishing the call, communication controller 103 receives the video data and the voice data transmitted from each of partner devices 2, 3, and 4 through network 5, and outputs the video data and the voice data to video and voice encoding/decoding unit 104. In addition, after establishing the call, communication controller 103 transmits the video data and the voice data input from video and voice encoding/decoding unit 104 to each of partner devices 2, 3, and 4 through network 5. Communication controller 103 operates according to a predetermined communication protocol. The communication protocol is typically SIP or H.323.

Video and voice encoding/decoding unit 104 operates at the timing according to the control of conference controller 102. Video and voice encoding/decoding unit 104 encodes video data input from video and voice synthesizer 105 and voice data input from voice input controller 109, and outputs the encoded data to communication controller 103. In addition, video and voice encoding/decoding unit 104 decodes the video data and the voice data from partner devices 2, 3, and 4 which are input from communication controller 103, and outputs the decoded data to video and voice synthesizer 105.

Video and voice synthesizer 105 operates at the timing according to the control of conference controller 102. Video and voice synthesizer 105 generates synthesized video data for synthesizing and displaying videos in accordance with the number of sites of the selected site information input from conference controller 102, based on the video data input from video and voice encoding/decoding unit 104, the video data input from video input controller 108, and still image data read from still image holder 107, and outputs the generated data to video and voice output controller 106. In addition, video and voice synthesizer 105 generates synthesized voice data by synthesizing the voice data from partner devices 2, 3, and 4 input from the video and voice encoding/decoding unit 104 and the voice data input from voice input controller 109, and outputs the synthesized voice data to video and voice output controller 106. In addition, video and voice synthesizer 105 outputs the video data input from video input controller 108 to video and voice encoding/decoding unit 104. Details of a configuration of video and voice synthesizer 105 will be described below.

Video and voice output controller 106 causes the synthesized video data input from video and voice synthesizer 105 to be displayed on a screen of display device 9 and causes a speaker of display device 9 to output the synthesized voice data as voice.

Still image holder 107 holds still image data for displaying a predetermined still image on the screen of display device 9 in advance. The predetermined still image is an image for notifying a current communication situation with the partner device until the video data is received from each of partner devices 2, 3, and 4.

Video input controller 108 outputs the video data input from video input device 7 to video and voice synthesizer unit 105.

Voice input controller 109 outputs the voice data input from voice input device 8 to video and voice encoding/decoding unit 104 and video and voice synthesizer 105.

<Configuration of Video and Voice Synthesizer>

Figure 2:
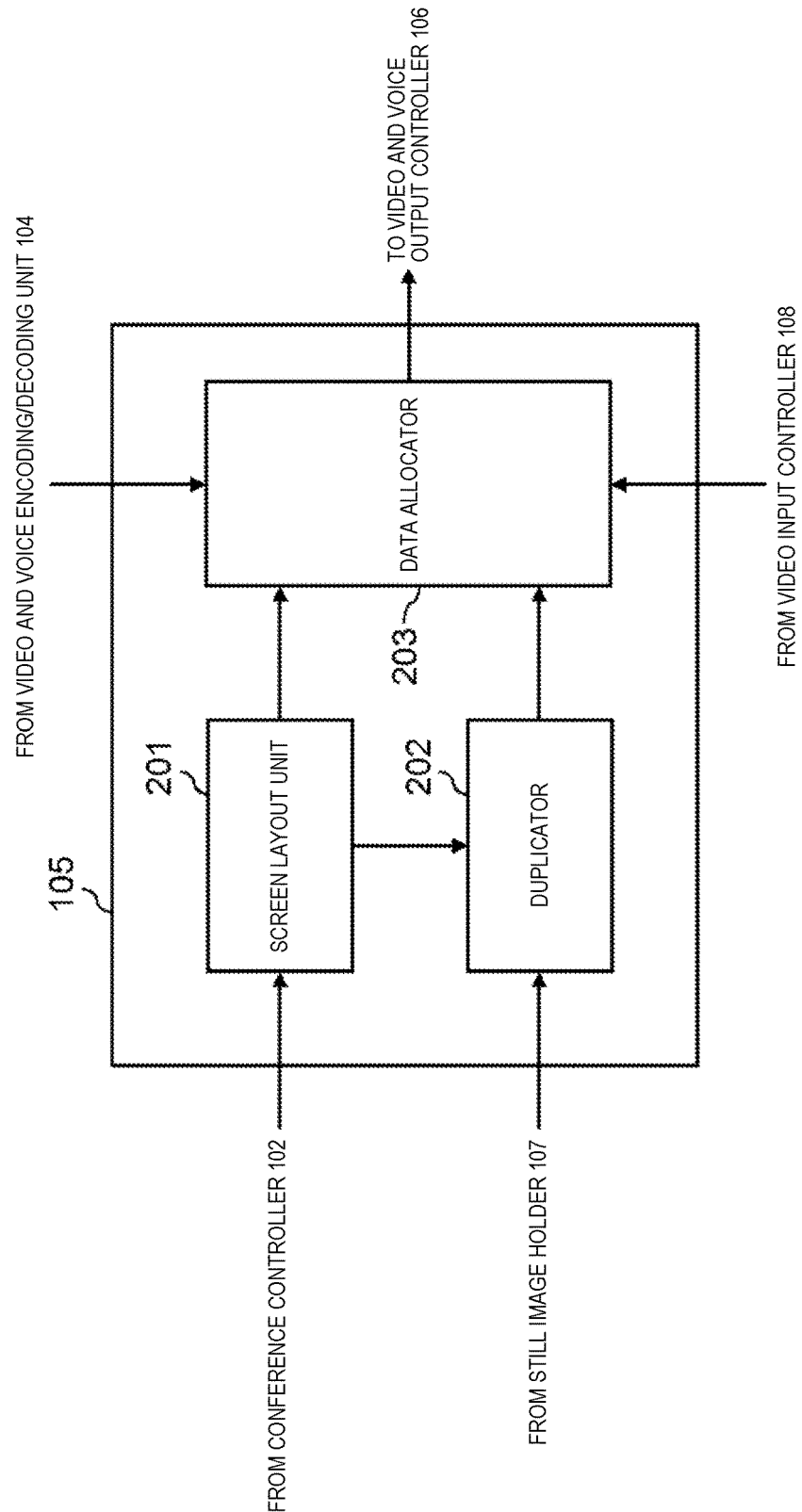
FIG. 2 is a block diagram illustrating a configuration of a video and voice output controller according to Exemplary Embodiment 1.

Next, an internal configuration of video and voice synthesizer 105 will be described with reference to FIG. 2. As illustrated in FIG. 2, video and voice synthesizer 105 includes screen layout unit 201, duplicator 202, and data allocator 203.

Screen layout unit 201 calculates a total value of the number of sites (partner devices) of the selected site information input from conference controller 102, and outputs the total value to duplicator 202. In addition, screen layout unit 201 performs layout setting processing for setting a screen layout for displaying divided screens divided into a total number of sites in which a videoconference is performed and "1" (host site) is added to a total value of the number of sites, and outputs screen layout information indicating the screen layout to data allocator 203. The layout setting processing includes processing for determining a screen region for displaying the video data from each partner device.

At the start time, duplicator 202 duplicates the still image data read from still image holder 107 by the same number as the total value input from screen layout unit 201, and outputs the duplicated data to data allocator 203.

Data allocator 203 generates the synthesized video data by allocating the still image data input from duplicator 202 to the screen layout of the screen layout information input from screen layout unit 201, and outputs the synthesized video data to video and voice output controller 106. In addition, each time the video data from partner devices 2, 3, and 4 is input from video and voice encoding/decoding unit 104, data allocator 203 generates newly synthesized video data by switching the still image data into the video data. At this time, data allocator 203 updates the synthesized video data without changing the screen layout.

<Transition of Connection State of Videoconference Communication Device>

Figure 3:
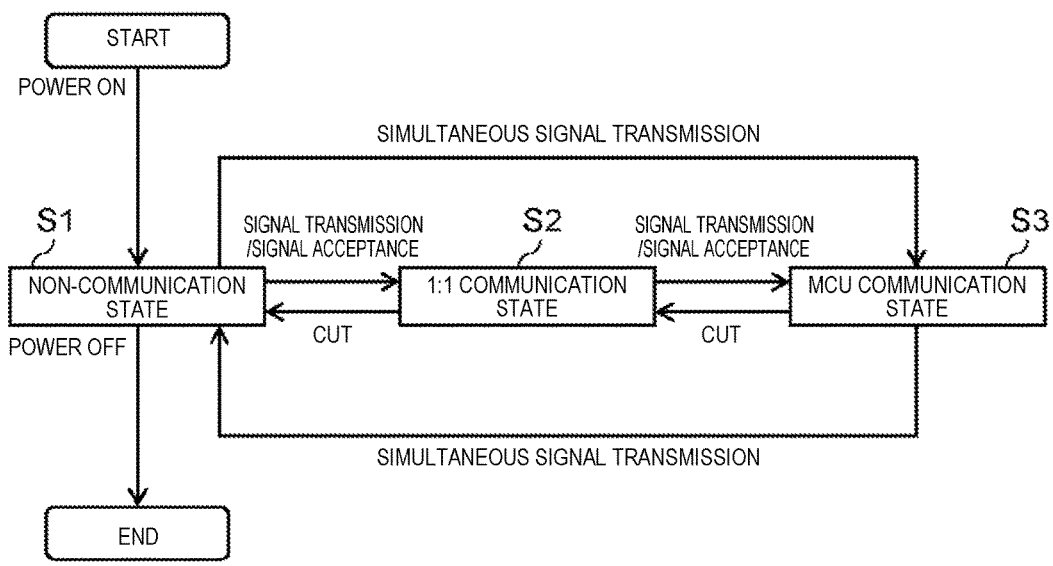
FIG. 3 is a state transition diagram illustrating transition of a state of a videoconference system according to Exemplary Embodiment 1.

Next, transition of a connection state of videoconference communication device 1 will be described in detail with reference to FIG. 3.

Videoconference communication device 1 starts an operation by turning on power.

Videoconference communication device 1 is in a non-communication state shortly after the power is turned on (S1).

In a case of being connected to one partner device 2 in the non-communication state (S1), videoconference communication device 1 performs signal transmission to partner device 2 and performs signal acceptance from partner device 2, and thereby, a one-to-one communication state (1:1 communication state) with partner device 2 is set (S2). If the connection with partner device 2 in a communication state is cut in the 1:1 communication state (S2), videoconference communication device 1 enters a non-communication state (S1). Videoconference communication device 1 ends an operation by turning the power off in the non-communication state (S1).

In addition, in a case of being connected to still another partner device 3 from the 1:1 communication state (S2), videoconference communication device 1 performs signal transmission to partner device 3 and performs signal acceptance from partner device 3, and thereby, entering a communication state (MCU communication state) with partner device 2 and partner device 3 at a plurality of sites (S3).

If the connection with partner device 3 in the communication state is cut, videoconference communication device 1 enters a one-to-one communication state (S2), and furthermore, if the connection with partner device 2 in the communication state is cut, videoconference communication device 1 enters the non-communication state (S1).

In addition, videoconference communication device 1 performs simultaneous signal transmission to partner devices 2, 3, and 4 in non-communication state (S1), thereby, entering the communication state (MCU communication state) with partner devices 2, 3, and 4 (S3). If the connections with partner devices 2, 3, and 4 are simultaneously cut, videoconference communication device 1 enters the non-communication state (S1).

A method of causing a user to manually input a signal transmission destination to videoconference communication device 1 at the time of signal transmission, a method of causing a user to select a list in which a plurality of pieces of signal transmission destination information stored in videoconference communication device 1 in advance are registered, or the like is considered as a method of performing the simultaneous signal transmission. In addition, an IP address, a telephone number, an identification code, or the like is considered as a method of specifying the signal transmission destination.

<Operation of Videoconference Communication Device>

Figure 4:
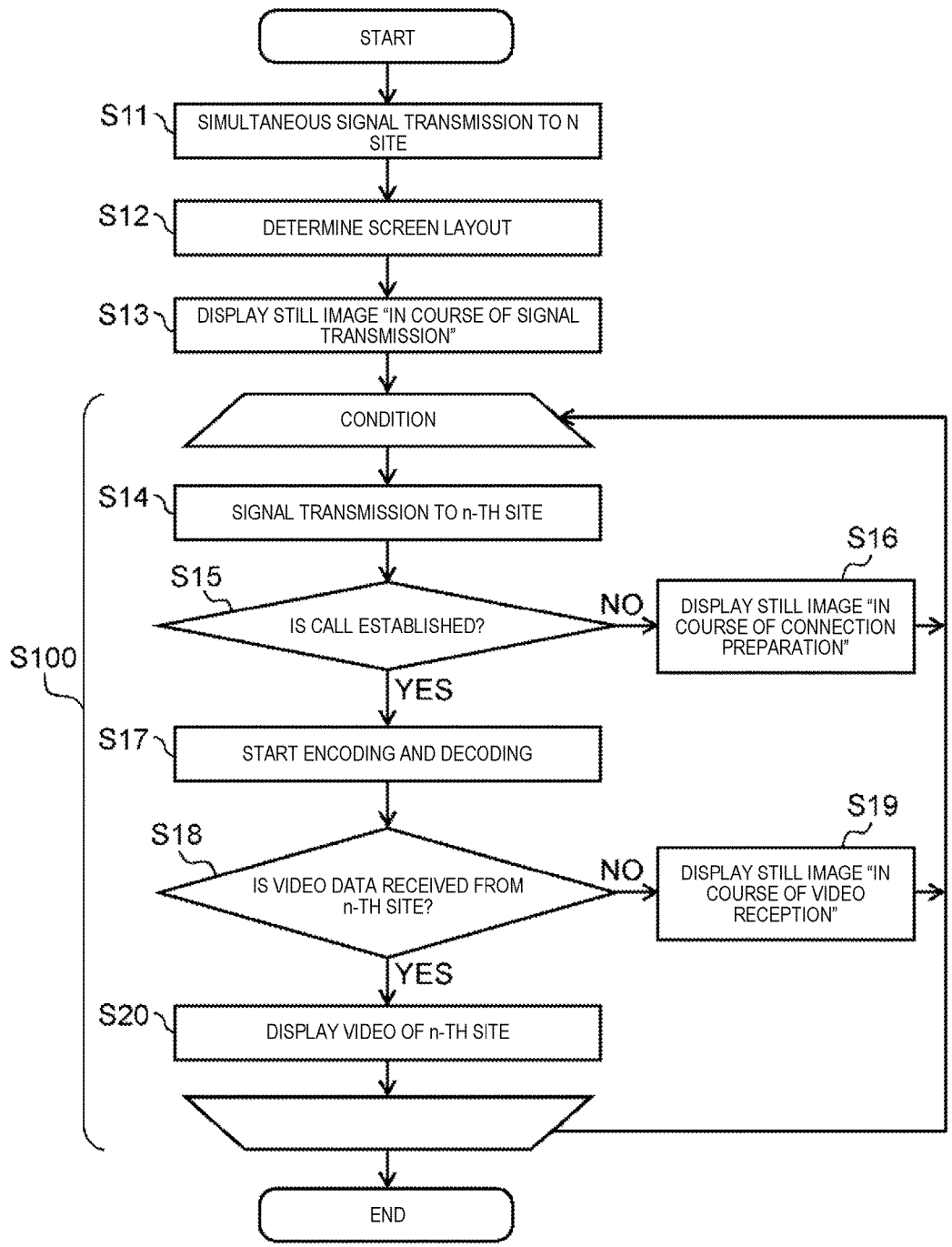
FIG. 4 is a flowchart illustrating an operation of the videoconference communication device according to Exemplary Embodiment 1.

Next, an operation of videoconference communication device 1 will be described in detail with reference to FIGS. 4 and 5. FIG. 5 illustrates an example of a case where videoconference communication device 1 performs the simultaneous signal transmission to partner devices 2, 3, and 4.

First, user instruction receiver 101 receives a signal from user operation input device 6, extracts the selected site information included in the received signal, and outputs the selected site information to conference controller 102.

Conference controller 102 controls communication controller 103 such that the simultaneous signal transmission to partner devices 2, 3, and 4 of N (N is an integer of 2 or more, N=3 in FIG. 5) sites of the selected site information is performed. Thereby, communication controller 103 performs the simultaneous signal transmission to partner devices 2, 3, and 4 (S11). Specifically, in a case where the selected site information is information of one list in which a plurality of pieces of signal transmission destination information is recorded, conference controller 102 can recognize site number N based on the number of signal transmission destinations of the signal transmission destination information registered in the list.

In addition, video and voice synthesizer 105 determines the screen layout which is (N+1) divided screens, based on the selected site information input from conference controller 102 (S12).

Figure 5A:
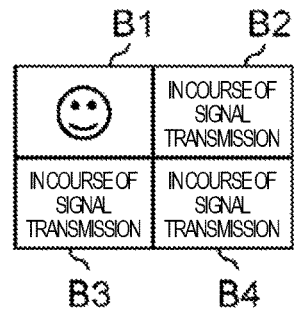
FIGS. 5A to 5E are schematic views illustrating examples of videos displayed on a screen according to Exemplary Embodiment 1.

Next, video and voice synthesizer 105 reads the still image data from still image holder 107 and controls video and voice output controller 106 so as to display the read still image data on each of the divided screens (S13). In a case where all the sites are before a response, video and voice synthesizer 105 displays the video of the host site on divided screen B1 and displays a still image of "in course of signal transmission" on the other divided screens B2, B3, and B4, as illustrated in FIG. 5A.

In a case where a condition that there is a site in which the video data is not received is satisfied, conference controller 102 controls communication controller 103 such that the signal transmission to the partner device of the n-th (n is an integer equal to or less than N) site in which the video data is not received is performed. Thereby, communication controller 103 performs the signal transmission to the partner device of the n-th site (S14).

Next, conference controller 102 determines whether or not a call is established in communication controller 103 (S15).

Figure 5B:
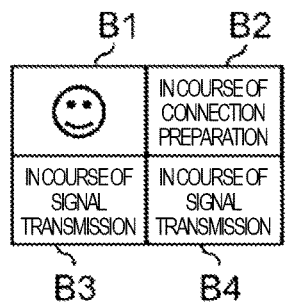

In a case where the call is not established in communication controller 103 (S15: NO) as the power of the partner device of the n-th site is turned off or the like, conference controller 102 performs a control of making video and voice synthesizer 105 display the still image. Thereby, video and voice synthesizer 105 reads the still image data from still image holder 107. Video and voice synthesizer 105 performs a control for displaying the still image of "in course of connection preparation" on divided screen B2 of display device 9 (S16) as illustrated in FIG. 5B. Thereafter, the flow returns to the processing of S14.

Meanwhile, in a case where the call is established in communication controller 103 (S15: YES), conference controller 102 performs a control such that with respect to video and voice encoding/decoding unit 104 starts encoding and decoding of the video data and the voice data (S17) and waits reception of the video data.

Next, conference controller 102 determines whether or not the video data is received from the partner device of the n-th site (S18).

Figure 5C:
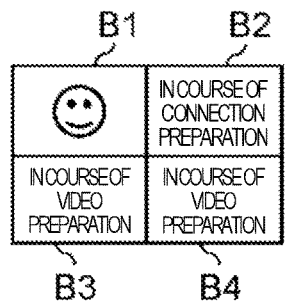

In a case where the video data is not received from the partner device of the n-th site due to loss of a packet because of being in a low bandwidth (S18: NO), conference controller 102 performs a control of making video and voice synthesizer 105 display a still image. Thereby, video and voice synthesizer 105 reads the still image data from still image holder 107. Video and voice synthesizer 105 performs a control for displaying the still image of "in course of video preparation" on divided screen B3 and B4 of display device 9 (S19) as illustrated in FIG. 5C. Thereafter, the flow returns to the processing of S14.

Figure 5D:
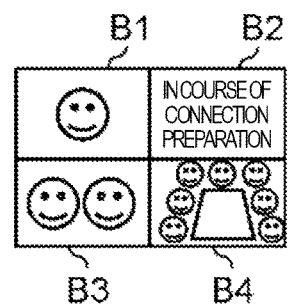

Meanwhile, in a case where the video data is received from the partner device of the n-th site (S18: YES), conference controller 102 performs a control of making video and voice synthesizer 105 display the video data from the partner device of the n-th site (S20). Thereby, video and voice synthesizer 105 performs a control of displaying the video on divided screens B3 and B4 of display device 9, as illustrated in FIG. 5D.

Conference controller 102, communication controller 103, video and voice encoding/decoding unit 104, and video and voice synthesizer 105 repeat the processing of S100 (S14 to S20) until the condition for performing the processing of S100 is not satisfied.

Figure 5E:
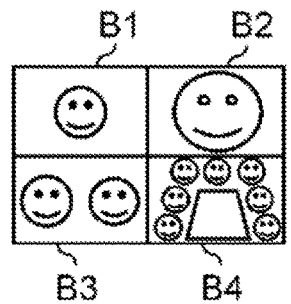

Thereby, in a case where video data from all the sites is received, videos are displayed on all divided screens B1, B2, B3, and B4 as illustrated in FIG. 5E.

As described above, according to the present embodiment, it is possible to display the synthesized video without changing a layout of a screen from the start, by displaying divided screens divided into the total number of sites in which a videoconference is performed before video data is received, and by sequentially displaying the received video data on each of the divided screens. Thereby, it is possible to prevent the screen from being unsightly to a viewer.

In addition, according to the present embodiment, it is possible for the viewer to recognize a current state until the video of each site is displayed, by displaying a still image notifying each of the divided screens of a current communication situation until video data from each of the partner devices is received.

(Exemplary Embodiment 2)

<Configuration and Connection Relationship of Videoconference Communication Device>

Next, a configuration of videoconference communication device 1a according to Exemplary Embodiment 2 will be described in detail below with reference to FIG. 6. In videoconference communication device 1a illustrated in FIG. 6, the same reference numerals or symbols will be attached to the same configuration parts as those of videoconference communication device 1 illustrated in FIG. 1, and description thereof will be omitted.

Figure 6:
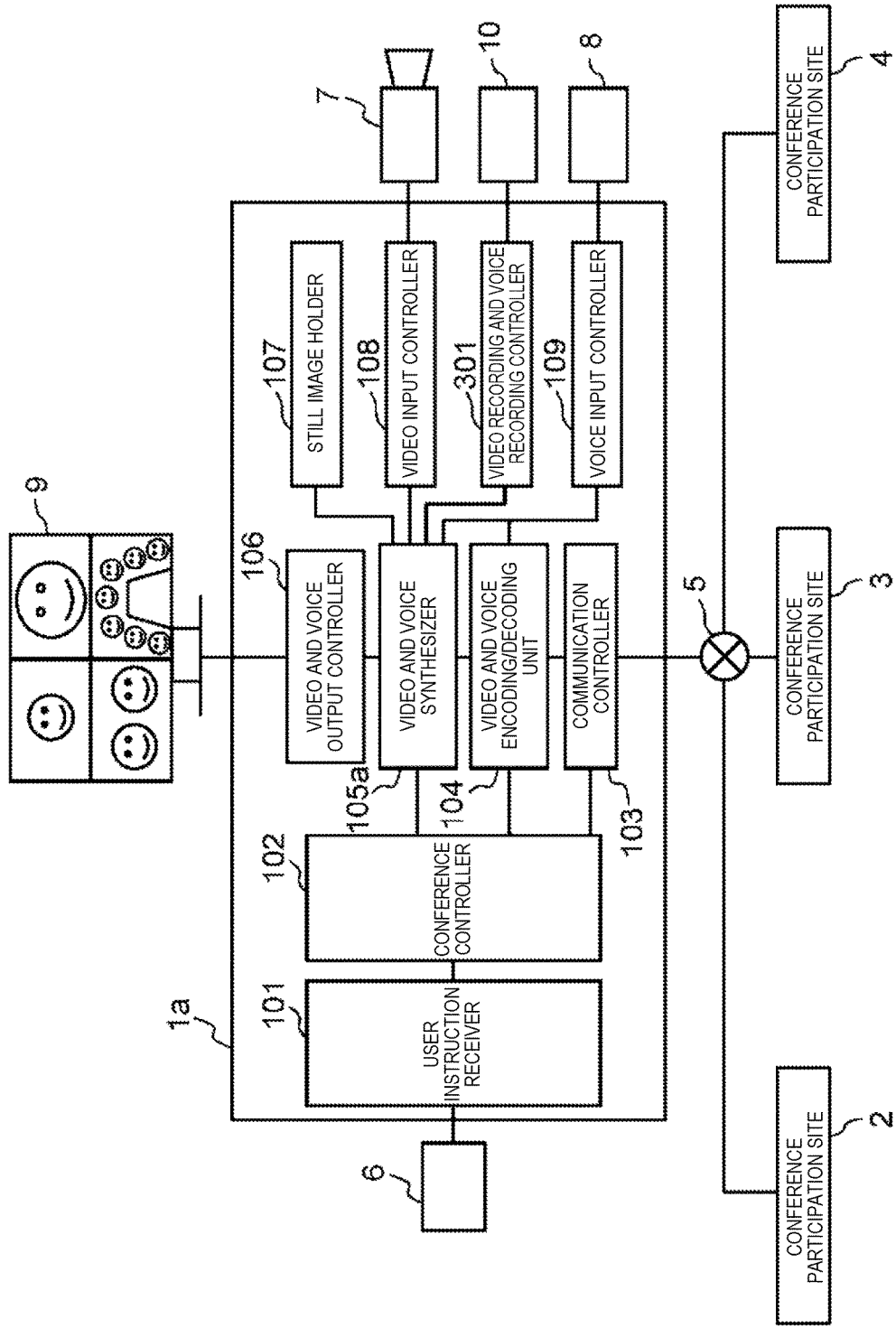
FIG. 6 is a block diagram illustrating a configuration of a videoconference system according to Exemplary Embodiment 2.

Videoconference communication device 1a illustrated in FIG. 6 adopts a configuration in which video recording and voice recording controller 301 is added to videoconference communication device 1 illustrated in FIG. 1. In addition, in videoconference communication device 1a illustrated in FIG. 6, video and voice synthesizer 105a is added instead of video and voice synthesizer 105 in FIG. 1.

In addition, videoconference communication device 1a is connected to video recording and voice recording device 10 in video recording and voice recording controller 301.

Video recording and voice recording device 10 records voice data and video data which are input from videoconference communication device 1a (video recording and voice recording controller 301).

Video and voice synthesizer 105a receives the video data from partner devices 2, 3, and 4 of all the sites, and outputs the synthesized video data and the synthesized voice data to video recording and voice recording controller 301 at timing when the synthesized video data is generated. The other functions of video and voice synthesizer 105a are the same as those of video and voice synthesizer 105.

Video recording and voice recording controller 301 records the synthesized video data and the synthesized voice data which are input from video and voice synthesizer 105a in video recording and voice recording device 10.

<Operation of Videoconference Communication Device>

Figure 7:
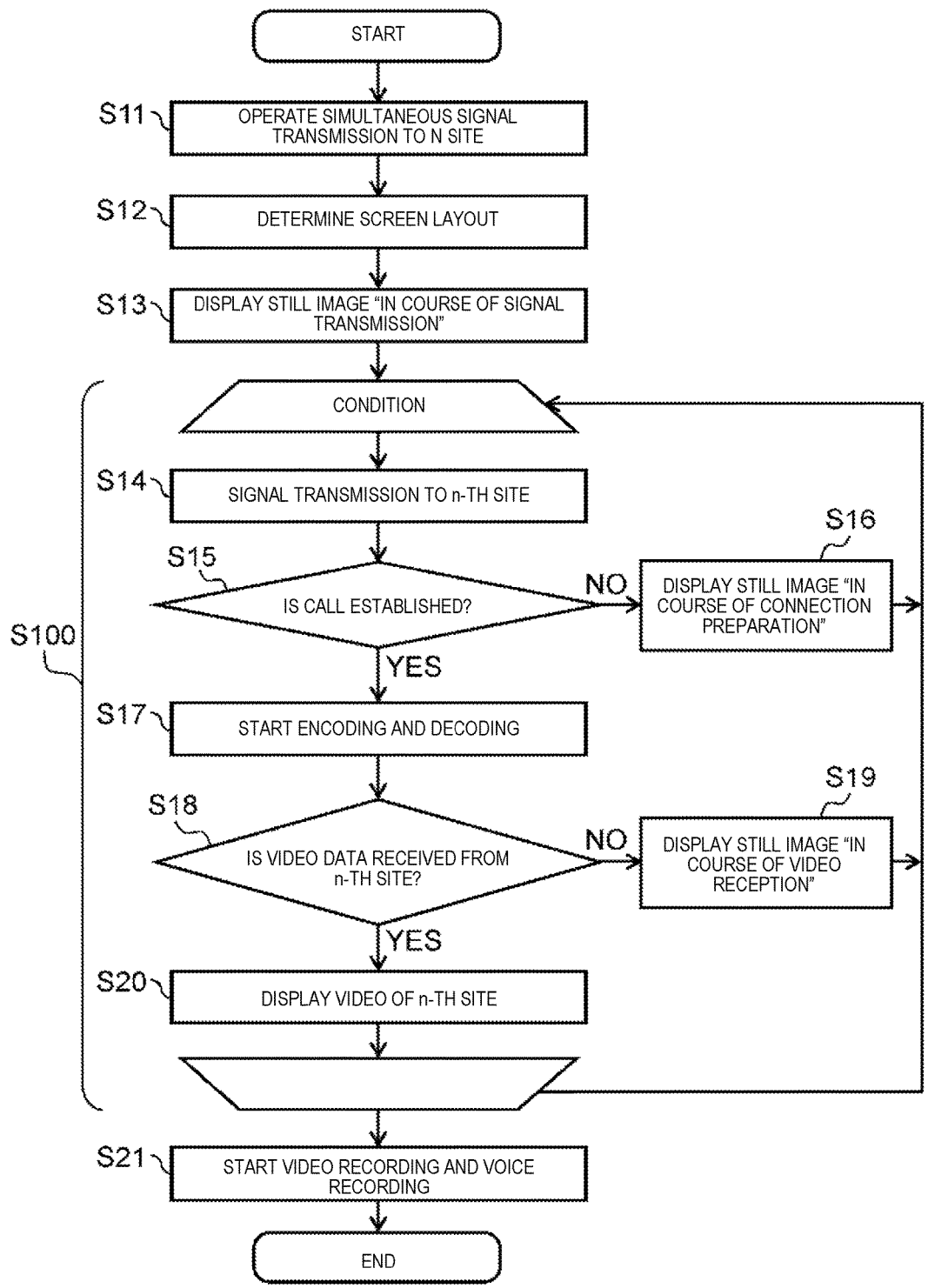
FIG. 7 is a flowchart illustrating an operation of the videoconference communication device according to Exemplary Embodiment 2.

Next, an operation of videoconference communication device 1a will be described in detail with reference to FIG. 7. In FIG. 7, the same reference numerals or symbols are attached to the steps common to those in FIG. 2, and description thereof is omitted.

In FIG. 7, a configuration in which step S21 is added after step S100 is adopted as compared with FIG. 2.

At a timing when the processing up to S100 is completed and the synthesized video data of the video data received from partner devices 2, 3, and 4 of all the sites is generated, video recording and voice recording controller 301 starts to record the synthesized video data and the synthesized voice data which are input from video and voice synthesizer 105a in video recording and voice recording device 10 (S21).

As described above, according to the present embodiment, since recording of the synthesized video data and the synthesized voice data starts after all the videos of a plurality of sites are displayed, it is possible to prevent unnecessary video data and voice data from being recorded.

In the present embodiment, the present disclosure is not limited to a case where video data is displayed on each of divided screens of a display device each time the video data is received from a partner device without changing a screen layout, and the above effects can be obtained even in a case where the video data is synthesized each time the video data is received and the synthesized video data is displayed while the screen layout is changed each time the video data is received, as in Exemplary Embodiment 1.

In addition, in the present embodiment, recording of voice data may start a little earlier than a timing when recording of the video data starts, such as a timing when decoding of the video data of all the sites is completed, or a time when processing in layout setting processing ends up to a predetermined ratio (for example, 80%). In addition, in the present embodiment, the timing when recording of the voice data starts may be able to be arbitrarily set by a user.

In the present disclosure, a type, an arrangement, a number, and the like of members are not limited to the aforementioned embodiment, and it is natural that an appropriate modification, such as an appropriate replacement of the configuration elements for obtaining the same action effects, can be made in a range without departing from the gist of the disclosure.

Specifically, in Exemplary Embodiment 1 and Exemplary Embodiment 2, a case where a still image is displayed until video is displayed is described, but the present disclosure is not limited to this, and character information such as a message other than the still image may be displayed.

In addition, in Exemplary Embodiment 1 and Exemplary Embodiment 2, a case where divided screens divided into the same size are displayed is described, but the present disclosure is not limited to this and if the screen layout is not changed, the divided screens divided into different sizes or divided screens in which a part overlaps may be displayed. In addition, in the present disclosure, the divided screens may be displayed on a part of the screen, a region where the divided screens are not allocated may be a black image, and a still image may be displayed on a region where the divided screens in a screen of the display device are not allocated.

In addition, in Exemplary Embodiment 1 and Exemplary Embodiment 2, the still images are changed in the order of "in course of signal transmission", "in course of connection preparation", and "in course of video preparation", but the present disclosure is not limited to this, and all the still images may be the same until the video is displayed. In addition, in the present disclosure, the still images other than those described above may be used as long as a content to be notified by the still image also includes information that understands a current communication situation.

INDUSTRIAL APPLICABILITY

The present disclosure is suitable for being used for a videoconference communication device that is provided at a host site and can be simultaneously connected to partner devices of a plurality of sites different from the host site.

REFERENCE MARKS IN THE DRAWINGS 1, 1a videoconference communication device
2, 3, 4 partner device (conference participation site)
6 user operation input device
7 video input device
8 voice input device
9 display device
10 video recording and voice recording device
101 user instruction receiver
102 conference controller
103 communication controller
104 video and voice encoding/decoding unit
105, 105a video and voice synthesizer
106 video and voice output controller
107 still image holder
108 video input controller
109 voice input controller
201 screen layout unit
202 duplicator
203 data allocator
301 video recording and voice recording controller

The invention claimed is:

1. A videoconference communication device which is provided at a host site and is simultaneously connectable to partner devices respectively provided at a plurality of sites different from the host site, the videoconference communication device comprising:
  a communication controller that is connected to each of the partner devices through a network and receives video data which is transmitted from each of the partner devices; and
  a display controller that causes a screen layout of divided screens to be displayed before the video data is received by the communication controller, and causes each region of the divided screens to sequentially display the video data which is received by the communication controller in each region of the divided screens,
  wherein a number of the divided screens is a total number of sites in which the videoconference is performed, the number of divided screens is determined before the video data is received by the communication controller, and the number of divided screens is fixed after the number of divided screens is determined such that the number of divided screens does not change from (i) when the number of divided screens is determined before the video data is received by the communication controller to (ii) when the videoconference is ended, and
  wherein before the communication controller receives video data from one of the partner devices, the display controller displays, in a divided screen corresponding to the one of the partner devices, a still image indicating a current communication situation with the one of the partner devices until the communication controllers receives the video data from the one of the partner devices.

2. The videoconference communication device of claim 1, wherein when there is an n-th site from among the plurality of sites from which video data is not received by the communication controller, the communication controller performs signal transmission to the partner device at the n-th site, and the communication controller determines whether or not a call is established with the partner device at the n-th site.

3. The videoconference communication device of claim 2, wherein when the communication controller determines that the call is not established with the partner device at the n-th site, the display controller displays, in the divided screen correspond to the partner device at the n-th site, a first still image indicating that indicating that the communication controller is preparing to connect to the partner device at the n-th site until the communication controller determines that the call is established with the partner device at the n-th site, and
  wherein when the communication controller determines that the call is established with the partner device at the n-th site, the display controller displays, in the divided screen correspond to the partner device at the n-th site, a second still image indicating that indicating that the communication controller is preparing to receive the video data from the partner device at the n-th site until the communication controller receives the video date from the partner device at the n-th site.

* * * * *